United States Patent [19]

Olbrich et al.

[11] Patent Number: 4,689,703
[45] Date of Patent: Aug. 25, 1987

[54] POSITIONING DEVICE FOR A MAGNETIC DISK MEMORY

[75] Inventors: Otto Olbrich; Rudolf Schachl, both of Taufkirchen; Vaclav Vanek, Haar, all of Fed. Rep. of Germany

[73] Assignee: Siemens Aktiengesellschaft, Berlin and Munich, Fed. Rep. of Germany

[21] Appl. No.: 696,184

[22] Filed: Jan. 29, 1985

[30] Foreign Application Priority Data

Feb. 7, 1984 [DE] Fed. Rep. of Germany ....... 3404231

[51] Int. Cl.⁴ .......................... G11B 5/48; G11B 21/16
[52] U.S. Cl. ........................................ 360/104; 360/97
[58] Field of Search ..................... 360/97–99, 360/103–106, 109, 75; 310/13, 36

[56] References Cited

U.S. PATENT DOCUMENTS

| | | | |
|---|---|---|---|
| 2,998,292 | 8/1961 | Lubkin et al. | 346/74 |
| 3,849,800 | 11/1974 | Cuzner et al. | 360/97 |
| 3,864,747 | 2/1975 | Pejcha | 360/98 |
| 4,037,264 | 7/1977 | Barkley et al. | 360/129 |
| 4,131,921 | 12/1978 | Gruczelak | 360/86 |
| 4,300,176 | 11/1981 | Gilovich et al. | 360/105 |
| 4,331,991 | 5/1982 | Morehouse et al. | 360/106 |
| 4,346,416 | 8/1982 | Riggle et al. | 360/97 X |
| 4,439,792 | 3/1984 | Van De Bult | 360/106 |
| 4,544,972 | 10/1985 | Kogure et al. | 360/105 |

FOREIGN PATENT DOCUMENTS

| | | | |
|---|---|---|---|
| 127058 | 12/1984 | European Pat. Off. | 360/106 |
| 55-70971 | 5/1980 | Japan | 360/106 |
| 58-68274 | 7/1983 | Japan . | |
| 1440455 | 6/1976 | United Kingdom . | |
| 2103430 | 2/1983 | United Kingdom . | |

OTHER PUBLICATIONS

Winfrey et al, "Design of . . . Magnetic Disk Memory", IEEE Trans. on Magnetics, vol. MAG-17, No. 4, Jul. 1981, pp. 1392-1395.
Electronics, Apr. 21, 1982, pp. 181-183.
Swartz, J., "Motor in Spindle . . . 140M Bytes", Mini--Micro Systems, Feb. 1983, pp. 143-148.
Heath, J., "Design of a Swinging Arm Actuator for a Disk File", IBM Journal of Res. and Dev., vol. 20, No. 4, Jul. 1976, pp. 389-397.
Dickie et al, "Disk File Actuator", IBM Technical Disclosure Bulletin, vol. 18, No. 10, Mar. 1976, pp. 3435-3436.

*Primary Examiner*—John H. Wolff

[57] ABSTRACT

A rotational positioner for a magnetic disk memory comprises a pedestal constituting a portion of the positioning magnet system and a positioner shaft. In a one-piece pivot member, pivot arms and bracket arms are integrated and disposed in common on a hub. Each pivot arm comprises a device at its free end for releasably receiving a head base plate which carries a pair of magnetic heads by way of a magnetic head mount.

8 Claims, 2 Drawing Figures

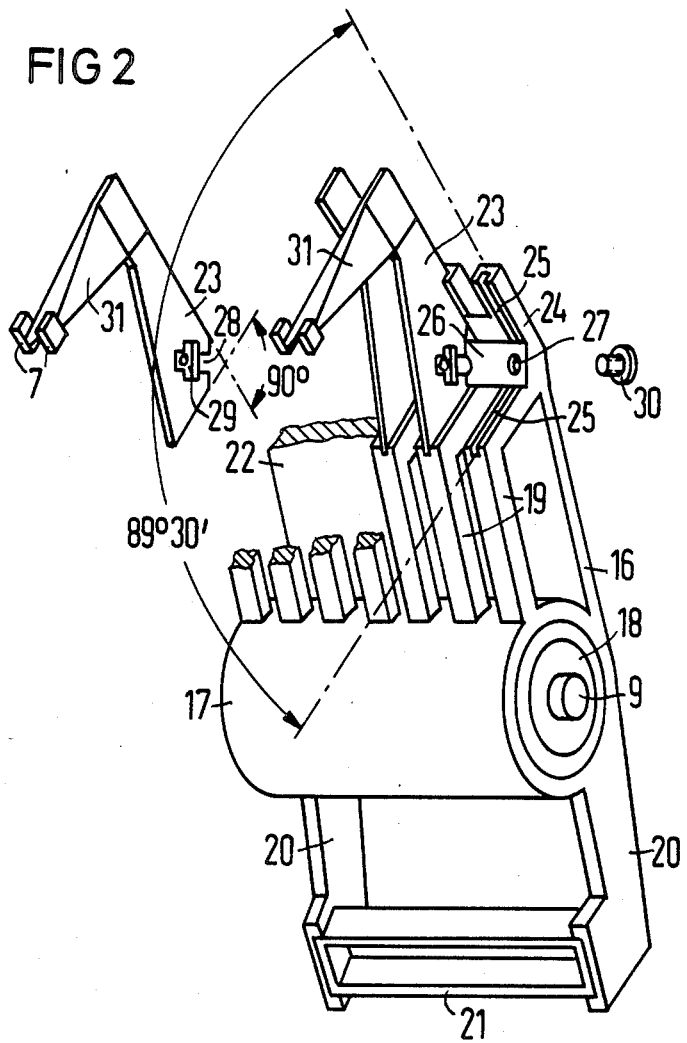

POSITIONING DEVICE FOR A MAGNETIC DISK MEMORY

CROSS REFERENCE TO RELATED APPLICATIONS:

Ser. No. 696,203, filed Jan. 29, 1985;
Ser. No. 693,204, filed Jan. 29, 1985
Ser. No. 696,207, filed Jan. 29, 1985;
Ser. No. 696,202, filed Jan. 29, 1985; and
Ser. No. 696,205, filed Jan. 29, 1985.

BACKGROUND OF THE INVENTION

1. Field of the Invention

The present invention relates to a positioning device for a magnetic disk memory constructed as a rotational positioner comprising a pedestal forming a part of a magnet system and carrying a positioner shaft whereby positioning arms which carry magnetic heads and clamp bracket arms for the magnet system are provided on the positioner shaft.

2. Description of the Prior Art

Technical development in magnetic disk memories continues to constantly work towards higher storage capacities, both with respect to the track density and the bit density as characteristics for the storage capacity per disk surface, on the one hand, and in view of the mechanical structure in order to accommodate as many magnetic disks as possible in a prescribed mounting space, on the other hand. An example of this is the so-called 5¼" fixed disk memory for which a mounting space having a mounting height of 82.5 mm and a base area of 146 mm×243 mm as a unit size has crystallized as a standard by analogy to the dimensions of competing floppy disk drives.

In addition to the attempt to accommodate as many magnetic disks as possible in this prescribed mounting space, i.e. to continue the development of the mechanical structure of the magnetic disk pack and its disposition in the housing of the magnetic disk memory, however, there are also attempts to improve the magnetic head positioner device in order to improve access time, precise positioning and, therefore, sensing reliability. A significant step in the direction towards higher storage densities in the magnetic disk memories was achieved by way of a positioning method in which the magnetic heads are no longer positioned absolutely relative to the data tracks of the magnetic disks. Instead, the position of the positioner is determined with respect to servo tracks with the assistance of track position information which is permanently stored on a servo disk. Given this positioning technique, the positioner device is a defining and integral part of the servo control loop. Accordingly, the mechanical properties of the positioner device are decisive factors for access time, access precision and the stability of the servo control loop.

Basically, two different types of positioner devices are known, the linear positioner and the rotational positioner. Given linear positioners, a positioner carriage to which the magnetic head positioning arms are secured is moved in the radial direction relative to the magnetic disk pack during the track selection, being moved, for example, by way of a moving coil system. The rotational positioner has a pivoting part which is constructed of a number of positioner arms which carry the magnetic heads. The pivoting part is pivotally seated on a positioner shaft disposed parallel to the axis of the disk pack and comprises a pair of brackets at the side facing away from the pivot arms. The brackets carry either a coil which is deflected relative to stationary magnets, or carry a magnet, whereby the excited coil is then stationarily disposed. In the former case, the rotational positioner is therefore designed as a swinging coil positioner; it is designed as a magnetic armature positioner in the latter case. Both types of rotational positioners are equivalent per se, at least in comparison to the linear positioner. The rotational positioner is very frequently employed given today's standard, smaller magnetic disk memories; its mass actually to be moved is slighter, it can be constructed smaller and therefore uses less energy. Overall, it is therefore faster and easier to control.

Known rotational positioners for multi disk memories are constructed such that pivot arms each having a pair of magnetic heads resiliently disposed directly thereon are provided, the pair of magnetic heads being allocated to mutually-facing disk surfaces of neighboring magnetic disks. Pivot arms are clamped to a hub with the interposition of shims and the hub is, in turn, seated on the positioner shaft. Given known rotational positioners, this shaft is, in turn, fixed to the housing of the magnetic disk memory, usually at one side, but sometimes at both sides.

There is, however, a disadvantage given this structure of the rotational positioner disclosed for example, in the publication IEEE Transactions on Magnetics, Vol. Mag-17, No. 4, July 1981, pp. 1392 et seq., in the publication Electronics, Apr. 21, 1982, pp. 181 et seq, or in the publications Mini-Microsystems, February 1983, pp. 143 et seq. The pivot part is composed of a plurality of parts that must be aligned relative to one another. Depending on the embodiment, either the entire appertaining pivot arm with the magnetic head mount must be replaced for changing magnetic heads, i.e. the pivot part must be dismantled, or even the rotational positioner must be removed as a unit, since the magnetic head mount is only accessible from the direction of the disk pack and can only be released from the pivot arm from this direction. In any case, repairs therefore require complicated dismantling and subsequent readjustments in order to realign the magnetic head systems or, respectively, the pivot arms to one another with the correct height and position.

SUMMARY OF THE INVENTION

It is therefore a main object of the present invention to provide a rotational positioner which is more simply constructed, is designed to be stiff despite its low mass and in the manufacture thereof expensive assembly and adjustment procedures are avoided, so that the production costs are kept low. Moreover, the rotational positioner should be designed such that individual magnetic heads are easy to replace without the entire rotational positioner having to be removed from the magnetic disk memory and, potentially, even taken apart for that purpose.

The above object is achieved, according to the present invention, in a rotational positioner which is characterized in that a one-piece pivot member is provided, pivot arms and bracket arms are integrated therein and disposed in common at a hub disposed with ball bearings on the positioner shaft, in that every pivot arm comprises a receiving means at its free end at which a head base plate is releasably disposed, the base plate carrying at least one magnetic head via a magnetic head mount, and the magnetic head is respectively assigned to a magnetic disk. In a one-piece pivot part, all pivot arms are exactly aligned in spacing and their position relative to one another in the very beginning. Since, moreover, the pivot arms are not designed as replaceable elements, the body of the pivot arm can be constructed such that, even given low mass, it is as stiff as possible per se and, therefore, a low vibration structure.

The above design goal, however, can only be realized in that, in accordance with the invention, the magnetic head mounts are fixed to a head base plate which is fixed to a free end of the respective pivot arm in a manner that is simple, reliable, secure and positionally precise. It is thereby essential that the head base plate, together with respective magnetic head mount, is fixed to the respective pivot arm proceeding from the back side of the pivot part which faces away from the disk pack. It is guaranteed by means of this measure that the sensitive surfaces of the magnetic disks are not damaged when changing magnetic heads.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 2 is a perspective view of the basic structure of a pivot part of the rotational positioner shown in FIG. 1.

DESCRIPTION OF THE PREFERRED EMBODIMENTS

Figure 1:
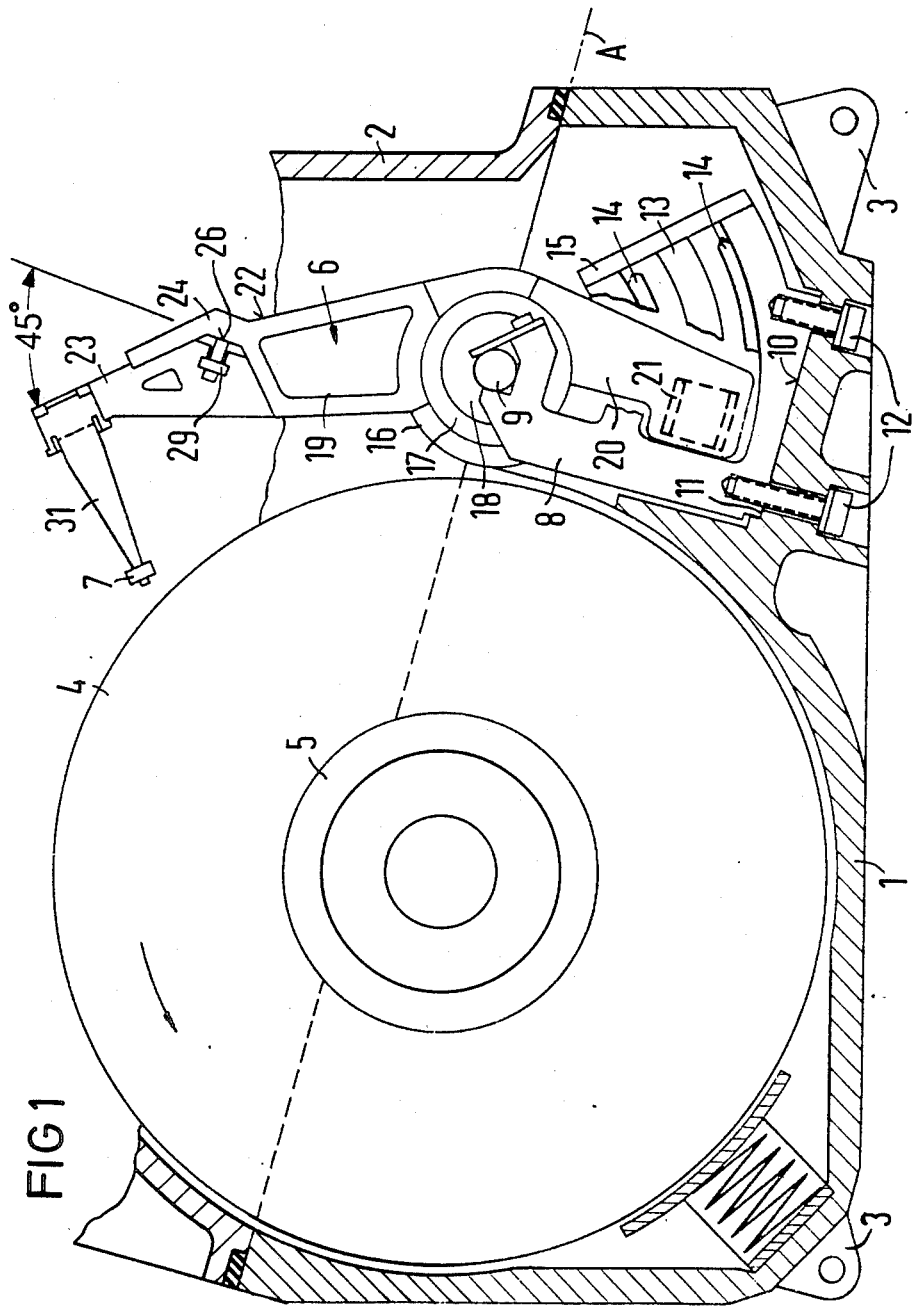
FIG. 1 is a sectional view through a housing of a magnetic disk memory comprising a schematic-illustrated magnetic disk pack and a rotational positioner assigned thereof.

The housing of a magnetic disk memory, shown in section in FIG. 1, is an essentially rectangular box which is subdivided along a diagonally extending parting plane A into a supporting shell 1 and a cover 2. The supporting shell 1 and the cover 2 comprise respective fastening eyelets or bosses 3 with which the housing can, for example, be suspended in a frame (not shown).

The housing is shown in section in order to illustrate the interior of the magnetic disk memory and, therefore its essential components. Therewith, a schematically-illustrated disk pack 4 is shown, this being disposed on a hub 5 and rotating in the direction of the arrow. A rotational positioner 6 is disposed laterally adjacent to the disk pack 4, the positioner 6 being shown in the idle position wherein the magnetic heads 7 are withdrawn from the disk pack.

The rotational positioner 6 comprises a U-shaped pedestal 8 having a positioner shaft 9 fixed to the distal ends of the legs, this shaft being aligned parallel to the axis of the disk pack 4. One aim of the design is to keep the immersion depth of the rotational positioner into the supporting shell 1 as low as possible; on the other hand, it is also more simple in terms of production and engineering in the sense of uncritical tolerances when the parting plane A, i.e. the edge of the supporting shell 1, is employed as dimensional plane of reference for the attachment region of the pedestal 8 to an end wall of the supporting shell. For this reason, the end wall is drawn inwardly in the attachment region and comprises an attachment surface 10 extending parallel to the parting plane A. The surface 10 is incised into the end wall and has shoulders 11 so that the pedestal 8 can be centered relative to this surface. Allocated to the attachment surface 10, the end wall of the supporting shell 1 comprises bores 11 into which fastening screws 12 are introduced from the exterior for fastening the pedestal 8 to the attachment surface 10.

The rotational positioner 6 can be designed in accordance with the swinging coil principle, as in the present illustrative embodiment, but can also be designed in accordance with the magnetic armature principle. In the present case, the pedestal 8 forms a part of the magnet system. To this end, a magnetic core 13, which is designed as an arcuate segment, is disposed between the legs of the pedestal. Correspondingly-shaped permanent magnets 14 are disposed in the pedestal 8 at both sides of the magnetic core 13. A reflux plate 15 is secured to the free-standing ends of the magnetic core or, respectively of the permanent magnets as a magnetic yoke. The pedestal 8 therefore assumes a double function: it permits the positioner shaft 9 to be seated at both sides and simultaneously forms a part of the magnet system for the rotational positioner 6.

A one-piece pivot member 16 is rotatably seated ont te stationary positioner shaft 9. To this end, the pivot member comprises a hub 17 which is rotatably seated on the positioner shaft 9 via ball bearings 18 (schematically indicated). Pivot arms 19 or, respectively, coil brackets 20 which project from the hub 17 at opposite sides thereof are integrated in the pivot member. Both coil brackets 20 are aligned parallel to one another and are seated at respective ones of the two sides of the hub 17. A coil 21 which, embracing the magnetic core 13, is guided between the permanent magnets 14 is disposed between the free ends of the coil brackets. It should also be pointed out that the pedestal 8 in FIG. 1 is shown partially cut away in order to be able to better illustrate the magnet system of the rotational positioner 6. In the illustration of FIG. 1, the coil 21 lies beneath the upper one of the two coil brackets 20 and is not seen.

For purpose of better illustration, the pivot member 19 is shown as a discrete part in FIG. 2 in a three-dimensional illustration. In this illustration, it now becomes more clear that the pivot member 19 comprises a plurality of parallel pivot arms 19 disposed at a prescribed distance from one another. The present example has proceeded on the assumption that the magnetic disk pack is, for example, constructed of several magnetic disks and that each pivot arm 19 of the rotational positioner 6 is allocated to mutually facing surfaces of two respective ones of these magnetic disks. For purpose of reinforcement, the rear sides of the pivot arms 19 form a common back wall 22.

The front ends of the pivot arms are shaped in a special way as receiving means in order to receive a respective head base plate 23. Each free end of a pivot arm 19 comprises an elbow 24 having guide grooves 25 therein, the grooves being disposed at essentially right angles relative to one another in a plane that lies perpendicular to the positioner shaft 9. In fact, the mutual angled position of the guide grooves 25 is of particular significance here and amount to somewhat less than 90°, as has been indicated in FIG. 2 by way of example with an angle of 89°30′.

These guide grooves 25 represent the guides for the correspondingly-shaped head base plates 23 which are essentially in the shape of a right triangle. The two sides of the head base plate which are precisely at right angles to one another are inserted from the top into the corresponding guide grooves. For the purpose of fastening the head base plates 23, the pivot arms 19 are not slotted through to their base, but comprise a seating surface 26 which includes a bore 27 exactly in the intersection of the central axis of the guide grooves 25. In accordance therewith, the corresponding triangle apex of each head base plate 23 is cut off and comprises a T-shaped slot 28 in this region which extends along the angle bisector. A square nut 29 is inserted into the transversely-disposed head end of the slot 28, the square nut 29 threadedly engaging a screw 30 inserted from the rear side of the pivot member 16. The thickness of the head of a base plate 23 is dimensionally allocated to the width of the guide grooves 25 such that a defined attitude of the head base plate 23 is achieved together with the 0.5° angular prescription. The direction of action of the screwed connection thereby guarantees a uniform force distribution to the seating locations of the triangle legs of the head base plate 23 in the guide grooves 25. It is therefore clear that the right angle of the guide grooves 25 represents only one possibility. Other angles can be selected as long as the triangular shape of the head base plate 23 is matched thereto.

Finally, it should also be pointed out that a magnetic head mount 31 is fixed to the outside, acute-angled triangle side of each head base plate 23, the mount 31 carrying a respective pair of magnetic heads at its distal ends.

The described illustrative embodiment shows the difference over conventional rotational positioners. Whereas individual positioner arms in prior devices are layered on top of one another with the interposition of shims to form the pivot part, these arms are integrated here into a onepiece pivot member together with the coil brackets; the pivot member can, for example, be manufactured as a finished cast part or as an extruded section. This design principle permits the pivot member to be fashioned with a low overall mass, but torsionally very stiff by means of a corresponding shaping. Moreover, its overall center of gravity can be selected such that it optimally coincides with the positioner axis, this balancing the rotational positioner.

As regards the rotational positioner itself, one of the essential prerequisites is therefore fulfilled in order to set the magnetic heads exactly to a defined track position with short access time despite high track densities. Such a design of the pivot member, on the other hand, is nonetheless only possible in combination with the described interchangeability of the magnetic head mounts on the basis of the releasable connection of the head base plates and pivot arms. This structural detail therefore simultaneously meets two requirements that are to be made of a modern magnetic disk memory, namely assembly and repair facilitation, i.e. interchangeability of the magnetic heads per se without expensive adjustment, on the one hand, and, on the other hand, the design of the pivot member as a one-piece component which can then be freely designed on the basis of modern design principles to be nonetheless torsionally stiff given a low mass.

Although we have described our invention by reference to a particular illustrative embodiment, many changes and modifications of the invention may become apparent to those skilled in the art without departing from the spirit and scope thereof. We therefore intend to include within the patent warranted hereon all such changes and modifications as may reasonably and properly be included within the scope of our contribution to the art.

We claim:

1. A rotational positioner device for a magnetic disk memory comprising:
   a pedestal, a positioner shaft carried on said pedestal and a first portion of a positioning magnetic system carried on said pedestal;
   a one-piece pivot member adapted to rotate on said positioner shaft and including a plurality of pivot arms extending in a first direction and bracket arms extending in a second direction, a second portion of the position magnetic system not between said bracket arms adjacent said first portion of the position magnetic system and including an electromagnetic coil fixed between said bracket arms;
   a plurality of head base plates, a plurality of head mounts and a plurality of magnetic heads, at least one magnetic head being carried by a head base plate via a respective magnetic head mount; and
   each of said pivot arms comprising receiving means for releasably mounting a respective head base plate, each of said receiving means comprising an elbow including two legs extending at a predetermined angle relative to one another and means defining a respective groove in each of said legs, said grooves of said legs lying in a plane perpendicular to said positioner shaft, and each of said head base plates having the general shape of a triangle having a predetermined angle and a thickness corresponding to the width of said grooves to be received in said grooves, said predetermined angle being slightly smaller than the angle with which the legs of said head base plate extend with respect to one another so that said legs are sprung by the respective head base plate to provide a clamping action for the respective head base plate.

2. The positioner device of claim 1, wherein: each of said positioner arms comprises a seating surface
   disposed at the base of said elbow and inclined at a prescribed angle with respect to one of said grooves and facing the respective head base plate, said seating surface including means defining a bore therethrough at the intersection of the central axes of said guide grooves;
   said head base plate comprising an edge extending at a corresponding angle to said seating surface and comprising means defining a T-shaped slot opening through said edge and aligned with the axis of said bore;
   a nut is mounted in said T-shaped slot; and
   a screw extends through said bore and threadedly engages said nut.

3. The positioner device of claim 2, wherein:
   said angle between said central axes of said guide grooves is less than 1° less than a right angle, and said leg sides of said head base plate are right-angled relative to one another.

4. The positioner device of claim 3, wherein:
   said pivot arms comprise a common back wall extending to said elbows.

5. The positioner device of claim 4, wherein:
   said pivot member is a die cast part.

6. The positioner device of claim 4, wherein:
   said pivot member is an extruded section.

7. The positioner device of claim 4, wherein:
   said bracket arms comprise means for balancing said pivot arms with respect to shape and mass in order to achieve a beneficial position of the overall center of gravity of said pivot member with respect to said positioner shaft.

8. The positioner device of claim 2, wherein: said prescribed angle is 45°.

* * * * *